(12) United States Patent
Yamakawa et al.

(10) Patent No.: US 8,201,657 B2
(45) Date of Patent: Jun. 19, 2012

(54) STEERING APPARATUS FOR VEHICLE (75) Inventors: Tomonari Yamakawa, Aichi (JP);
Hajime Tanaka, Toyota (JP)

(73) Assignee: JTEKT Corporation, Osaka (JP)

( * ) Notice: Subject to any disclaimer, the term of this patent is extended or adjusted under 35 U.S.C. 154(b) by 533 days.

(21) Appl. No.: 12/461,293

(22) Filed: Aug. 6, 2009

(65) Prior Publication Data

US 2010/0032230 A1    Feb. 11, 2010

(30) Foreign Application Priority Data

Aug. 11, 2008  (JP) ................................ 2008-206735

(51) Int. Cl.
*B62D 1/16* (2006.01)
(52) U.S. Cl. ......................................... 180/444; 74/497
(58) Field of Classification Search .................. 180/443, 180/444; 74/496, 497
See application file for complete search history.

(56) References Cited

U.S. PATENT DOCUMENTS

| | | | |
|---|---|---|---|
| 5,033,568 A * | 7/1991 | Oda et al. | 180/414 |
| 5,156,228 A * | 10/1992 | Kato et al. | 180/441 |
| 5,303,793 A | 4/1994 | Kato et al. | |
| 2001/0027895 A1 | 10/2001 | Murata et al. | |
| 2010/0263474 A1 * | 10/2010 | Tanaka et al. | 74/492 |

FOREIGN PATENT DOCUMENTS

| | | |
|---|---|---|
| EP | 1 653 101 A1 | 5/2006 |
| JP | A-3-227772 | 10/1991 |

OTHER PUBLICATIONS

Extended European Search Report issued in European Patent Application No. 09167544.7 dated Jun. 24, 2011.

* cited by examiner

*Primary Examiner* — Paul N Dickson
*Assistant Examiner* — Wesley Potter
(74) *Attorney, Agent, or Firm* — Oliff & Berridge, PLC (57) ABSTRACT A cam follower includes an oval rotational body which is rotationally supported on a fixed pin, and in which an outer circumferential shape thereof is an oval, a long axis of the oval is longer than a width of the cam groove, and a short axis of the oval is shorter than the width of the cam groove, the oval rotational body being biased and being rotated by a biasing spring in one direction about the fixed pin. As a consequence, when a steering wheel is in a neutral position, the outer circumferential surface of the cam follower comes into contact with both side surfaces of the cam groove in the width direction of the cam groove and gaps therebetween can be eliminated. As a result, neutral stability of the steering wheel and steering feeling during straightforward traveling are improved.

10 Claims, 8 Drawing Sheets

STEERING APPARATUS FOR VEHICLE

INCORPORATION BY REFERENCE

The disclosure of Japanese Patent Application No. 2008-206735 filed on Aug. 11, 2008 including the specification, drawings and abstract is incorporated herein by reference in its entirety.

BACKGROUND OF THE INVENTION

1. Field of the Invention

The invention relates to a steering apparatus for a vehicle which is provided with a first rotational member that receives a steering torque from a steering wheel and a second rotational member that receives the steering torque from the first rotational member and transmits the steering torque to steered wheels, and by which a steering angle of a steering wheel changes as the steering wheel moves away from the neutral position.

2. Description of the Related Art

A steering apparatus for a vehicle of this type is available in which, as described Japanese Patent Application Publication No. 3-227772 (JP-A-3-227772), a first rotational member and a second rotational member are arranged in tandem in a state in which a rotational axis of the first rotational member is displaced from a rotational axis of the second rotational member, and a cam follower provided at the upper end surface of the second rotational member in a position displaced from the rotational axis thereof is engaged with a cam groove that is formed in a lower end surface of the first rotational member in a direction perpendicular to the rotational axis thereof.

In the above-described steering apparatus for a vehicle, where a gap in excess of a designed size appears between the cam follower and cam groove due to a dimension error thereof, neutral stability of the steering wheel and steering feeling during straightforward movement are degraded.

SUMMARY OF THE INVENTION

It is an object of the invention to provide a steering apparatus for a vehicle in which gaps between a cam follower and both side surfaces of a cam groove in the width direction of a cam groove can be eliminated in a neutral position of a steering wheel.

A steering apparatus for a vehicle according to one aspect of the invention includes: a first rotational member that receives a steering torque from a steering wheel; a second rotational member that receives the steering torque from the first rotational member and transmits the steering torque to a steered wheel;

a cam follower that is provided at an end surface of one of the first rotational member and the second rotational member and provided in a position displaced with respect to a rotational shaft of the one of the rotational members; and a cam groove that is formed in an end surface of the other of the first rotational member and the second rotational member and extends in a direction perpendicular to a rotational shaft of the other of the rotational members. The rotational shaft of the first rotational member is displaced with respect to the rotational shaft of the second rotational member, and in a state in which the first rotational member is arranged above the second rotational member, the cam follower engages with the cam groove. The cam follower includes: a fixed pin that is fixed to the one of the rotational members; an oval rotational body which is rotationally supported on the fixed pin, and in which an outer circumferential shape thereof is an oval, a long axis of the oval is longer than a width of the cam groove, and a short axis of the oval is shorter than the width of the cam groove; and a biasing member that biases the oval rotational body to rotate the oval rotational body in one direction of circumferential directions of the fixed pin.

The term "oval" in the description of the invention also includes a mathematically defined ellipse, a substantially elliptical shape that is analogous to the ellipse, and also a shape in which both ends of a pair of parallel linear portions are connected by semicircular portions.

In the steering apparatus for a vehicle according to the above-described aspect, the oval rotational body may include an oval core that is rotationally supported on the fixed pin and has an oval outer circumferential shape; and a flexible belt that is provided radially outside the oval core to be deformed into an oval shape, and can rotate about the oval core.

Further, in the steering apparatus for a vehicle according to the above-described aspect, a plurality of rolling elements may be retained between an outer circumferential surface of the oval core and an inner circumferential surface of the flexible belt.

Further, in the steering apparatus for a vehicle according to the above-described aspect, the biasing member may be a wire spring that is elastically deformed in a circular arc shape so that the wire rod extends along an outer circumferential surface of the fixed pin; and one end of the wire spring may be fixed to the fixed pin and the other end of the wire spring may be fixed to the oval rotational body, whereby the wire spring may rotationally bias the oval rotational body about the fixed pin.

Further, in the steering apparatus for a vehicle according to the above-described aspect, the fixed pin and the oval rotational body may be screwed together; and a spring as the biasing member biases the oval rotational body in an axial direction of the fixed pin.

With the steering apparatus for a vehicle according to the above-described aspect, when the steering wheel is positioned in a neutral position, the outer circumferential surface of the oval rotational body provided at the cam follower is brought by the biasing member into contact with both side surfaces of the cam groove in the width direction of the cam groove. Therefore, neutral stability of the steering wheel and steering feeling during straightforward movement are improved. In this case, the biasing member may be constituted by a spring wire rod that is fixed at both ends to the oval rotational body and fixed pin, respectively. The fixed pin and the oval rotational body may be screwed together, and a spring as the biasing member may bias the oval rotational body in an axial direction of the fixed pin.

Where the steering wheel is operated, the steering torque thereof is transmitted to the steered wheels via the first rotational member and the second rotational member. In this case, the rotation angle of the second rotational member nonlinearly increases as the steering wheel moves away from the neutral position. In other words, the rotation angle of the second rotational member increases with the increase in the rotation angle of the first rotational member from the neutral position. Thus, the steering angle of the steered wheels changes as the steering wheel moves away from the neutral position.

When the first rotational member is rotated by a steering wheel operation and the second rotational member rotates in response to this rotation of the first rotational member, the cam follower moves inside the cam groove. In this case, the oval rotational body of the cam follower is pushed against one side surface of the cam groove. This pushing force generates a momentum in the direction of rotating the oval rotational body about the fixed pin in the direction opposite to the biasing direction of the biasing member. Further, where this momentum becomes larger than the biasing force of the biasing member, the oval rotational body rotates against the action of the biasing member and the long axis of the oval rotational body moves closer in parallel to both side surfaces of the cam groove. As a result, a gap, although a very small one, is formed between the other side surface of the cam groove and the cam follower, and because of this gap the cam follower can be smoothly moved inside the cam groove.

In this case, when the cam follower moves inside the cam groove, the outer circumferential surface of the oval rotational body and the side surface of the cam groove may slip with respect to each other or be in sliding contact with each other. Further, the flexible belt provided radially outside the outer circumferential surface of the oval core may roll over the side surface of the cam groove, while rotating about the oval core. In this case, where a plurality of rolling elements are retained between the outer circumferential surface of the oval core and the inner circumferential surface of the flexible belt, the rotation of the flexible belt about the oval core can be made smoother and the movement of the cam follower in the cam groove during steering wheel operation can be performed smoother.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

The first embodiment of the invention will be described below with reference to FIGS. 1 to 5.

Figure 1:
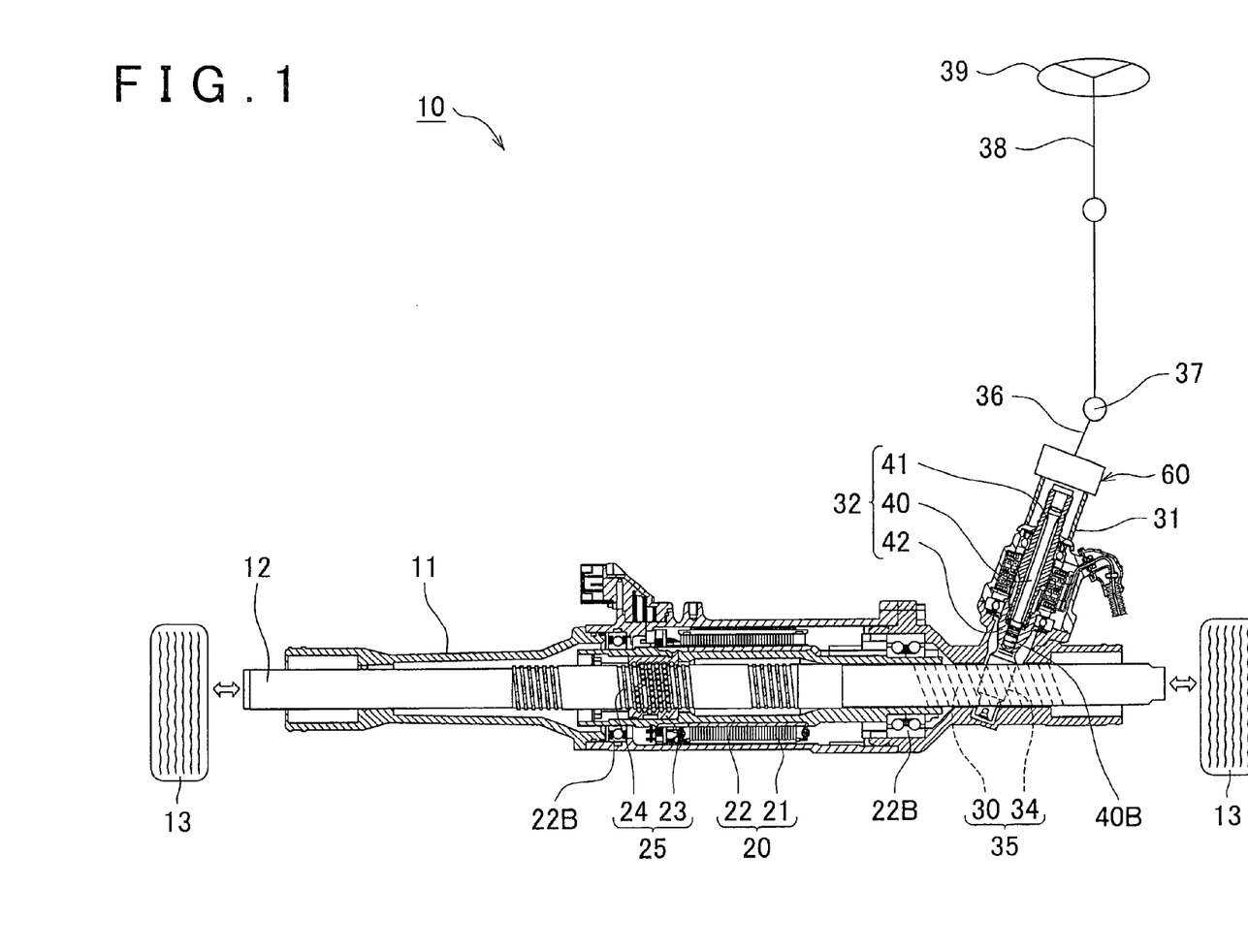
FIG. 1 is a schematic diagram of a vehicle equipped with a steering apparatus for a vehicle according to the first embodiment of the invention.

As shown in FIG. 1, in a steering apparatus 10 in accordance with the first embodiment of the invention, a translation shaft 12 is inserted through a tubular housing 11. Both end portions of the translation shaft 12 are linked to steered wheels 13 via a tie rod (not shown in the figure).

The tubular housing 11 is fixed to a vehicle body (not shown in the figure), and an alternating current (AC) motor 20 is contained in an axially intermediate portion of the housing. The AC motor 20 is a brushless three-phase AC motor and has a cylindrical motor stator 21 and a cylindrical motor rotor 22 that has a magnet on the outer circumferential surface. The motor stator 21 is joined and fixed to the inner side of the tubular housing 11, and the motor rotor 22 is fitted in the motor stator 21 so that there is a space therebetween and rotatably supported at both ends on the tubular housing 11 by bearings' 22B. The translation shaft 12 is inserted through inside the motor rotor 22.

A ball screw nut 23 is installed at the inner surface of the motor rotor 22. An axial intermediate portion of the translation shaft 12 is a ball screw shaft 24, and the ball screw nut 23 and ball screw shaft 24 are screwed together to configure a ball screw mechanism 25. Where the motor rotor 22 rotates together with the ball screw nut 23, the ball screw shaft 24 moves straightforward with respect to the tubular housing 11, whereby the steered wheels 13, 13 are steered.

Figure 2:
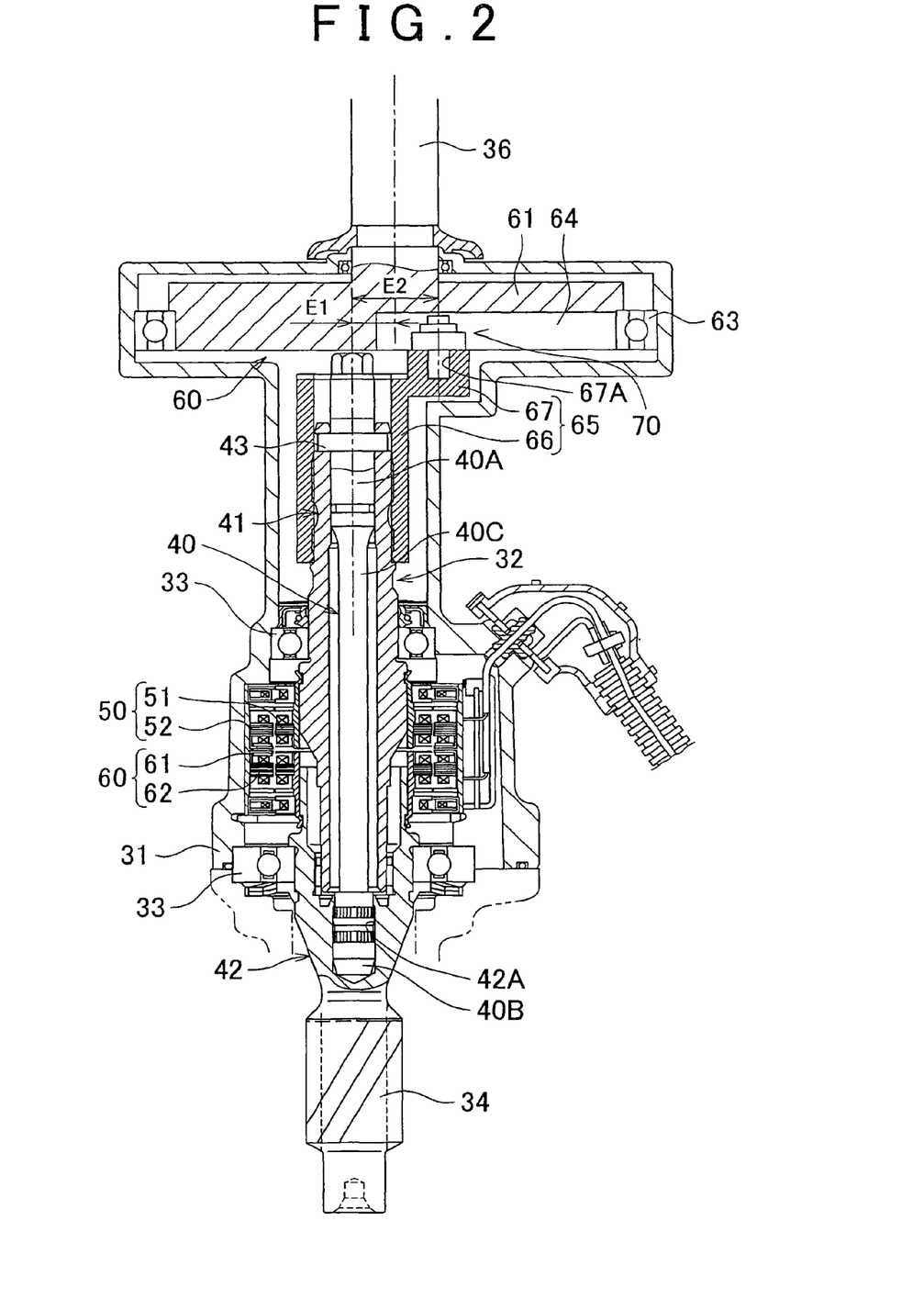
FIG. 2 is a cross-sectional view of a branched housing.

A rack 30 is formed in a position close to one end of the translation shaft 12. A branch housing 31 is formed in a position close to one end of the tubular housing 11 correspondingly to the rack. The branched housing 31 branches upward off the tubular housing 11, and a rotational shaft 32 is rotatably accommodated inside the branched housing. A pinion 34 provided at the lower end of the rotational shaft 32 meshes with the rack 30 to configure a rack-and-pinion mechanism 35. The lower end portion of an intermediate shaft 36 is linked to the upper end portion of the rotational shaft 32 via an eccentric joint mechanism 60 that will be described hereinbelow, the lower end portion of a steering shaft 38 is linked to the upper end portion of the intermediate shaft 36 via a universal joint 37, and a steering wheel 39 is mounted on the upper end portion of the steering shaft 38. As shown in FIG. 2, the intermediate shaft 36 is provided parallel to the rotational shaft 32 in a position displaced from the rotational shaft 32 by an intershaft distance E1.

As shown in FIG. 2, the rotational shaft 32 is constituted by a torsion bar 40, a first extension sleeve 41, and a second extension sleeve 42. In the torsion bar 40, an initial end portion 40A on the steering wheel 39 side and a final end portion 40B at a side far from the steering wheel 39 have substantially identical diameters, and an intermediate portion 40C located between the initial end portion 40A and final end portion 40B has a diameter less than that of the end portions. As a result, where the torsion bar 40 receives a load torque, mainly the intermediate portion 40C is torsionally deformed.

The first extension sleeve 41 covers almost the entire intermediate portion 40C of the torsion bar 40, so that there is a space between the first extension sleeve 41 and the intermediate portion 40C, and also joined and fixed to the initial end portion 40A of the torsion bar 40. Further, a pin 43 passes through in the width direction in the joined portion of the first extension sleeve 41 and the initial end portion 40A of the torsion bar 40. As a result, the first extension sleeve 41 rotates integrally only with the initial end portion 40A from among the portions of the torsion bar 40.

The second extension sleeve 42 is formed integrally with the upper end portion of the pinion 34 and extends upward. The lower end portion of the first extension sleeve 41 is fitted in the second extension sleeve 42 so that there is a space therebetween, and the final end portion 40B of the torsion bar 40 that protrudes from the lower end portion of the first extension sleeve 41 is spline joined to a small-diameter hole 42A provided in the back portion of the second extension sleeve 42. As a result, the second extension sleeve 42 rotates integrally only with the final end portion 40B from among the portions of the torsion bar 40. Further, in a case where the intermediate portion 40C twists due to a difference in force between the steering wheel 39 and steered wheels 13, a difference appears between the rotation position of the first extension sleeve 41, which rotates integrally with the initial end portion 40A of the torsion bar 40, and the rotation portion of the second extension sleeve 42, which rotates integrally with the final end portion 40B of the torsion bar 40.

The rotational shaft 32 is rotatably supported by a pair of bearings 33 inside the branched housing 31. One bearing 33 is disposed in the axial intermediate portion of the first extension sleeve 41, and the other bearing 33 is disposed in the axial intermediate portion of the second extension sleeve 42. An end portion of the rotational shaft 32 on the side opposite to the pinion 34 and the intermediate shaft 36 are linked by an eccentric joint mechanism 60 that will be described below in greater detail.

The eccentric joint mechanism 60 is provided with a first rotational base 61 as a first rotational member that is formed integrally with the lower end portion of the intermediate shaft 36 and a second rotational base 65 as a second rotational member that is fixed to the upper end portion of the first extension sleeve 41 of the rotational shaft 32. The second rotational base 65 can rotate integrally with the upper end portion of the first extension sleeve 41, and can rotate in response to the rotation of the first rotational base 61. The intermediate shaft 36 that is the rotational shaft of the first rotational base 61 and the rotational shaft 32 that is the rotational shaft of the second rotational base 65 are displaced from each other by an intershaft distance E1.

As shown in FIG. 2, the first rotational base 61 is formed in a disk shape that protrudes radially outward from the lower end portion of the intermediate shaft 36. A bearing 63 is provided in a space between the outer circumferential surface of the first rotational base 61 and the inner circumferential surface of the branched housing 31. A cam groove 64 that extends radially through the center of the first rotational base 61 is formed as a depression in the lower surface of the first rotational base 61 that faces the second rotational base 65.

In the second rotational base 65, a cylindrical body 66 that is spline joined to the outer side of the rotational shaft 32 and a pin fixing stand 67 that protrudes radially outward, in the radial direction of the rotational shaft 32, from the upper end portion of the cylindrical body 66 are provided integrally, and a cam follower 70 protrudes from the pin fixing stand 67 toward the lower surface of the first rotational base 61. A rotational shaft of the cam follower 70 is provided parallel to the rotational shaft of the second rotational base 65 in a position displaced by an intershaft distance E2 therefrom. The intershaft distance E2 is greater than the intershaft distance E1 between the rotational shaft (intermediate shaft 36) of the first rotational base 61 and the rotational shaft (rotational shaft 32) of the second rotational base 65. The cam follower 70 is inserted from below and engaged with the cam groove 64 formed in the lower surface of the first rotational base 61. With the steering apparatus 10 for a vehicle provided with the above-described features, as the steering wheel 39 moves away from the neutral position (the first rotational base 61 is rotated by the operation of the steering wheel 39, and the rotation angle of the first rotational base 61 from the neutral position increases), the rotation angle of the rotational shaft 32 and the second rotational base 65 varies nonlinearly with respect to the rotation angle of the steering wheel 39, and the steered angle of the steered wheels 13, 13 changes.

Figure 4A:
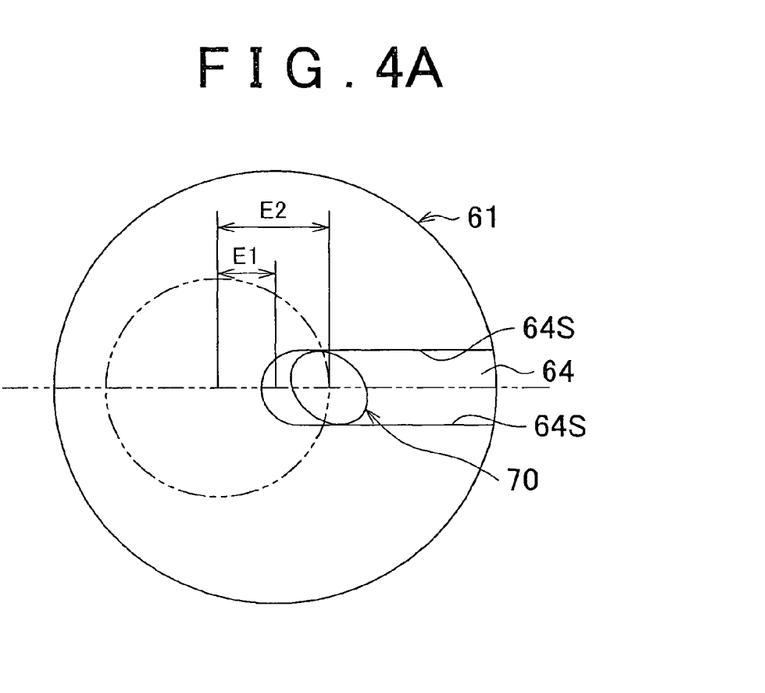
FIG. 4A illustrates a mutual arrangement of the cam groove and cam follower in a neutral position.
Figure 4B:
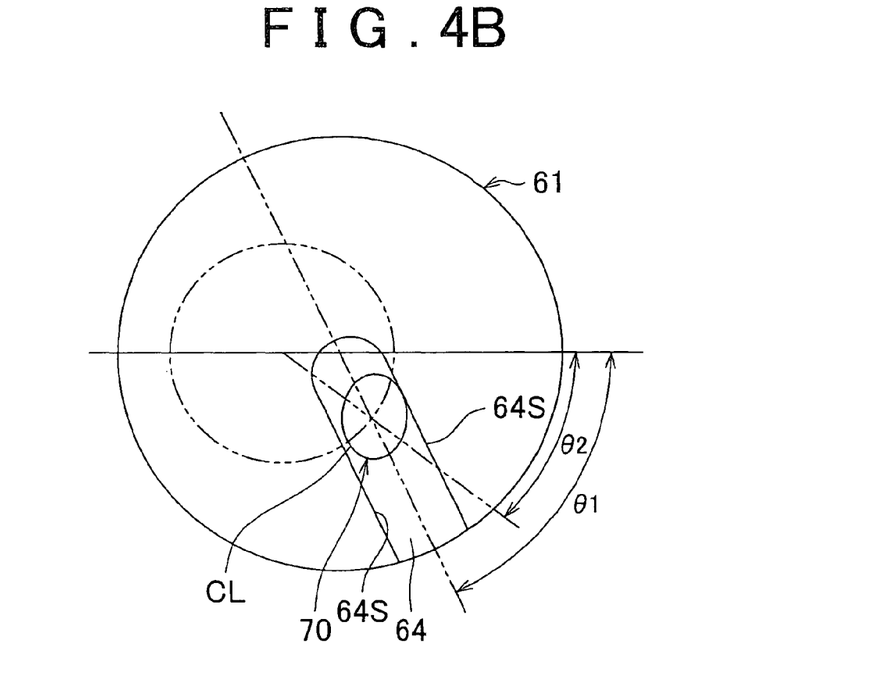
FIG. 4B illustrates a mutual arrangement of the cam groove and cam follower in a position displaced from the neutral position.
Figure 5:
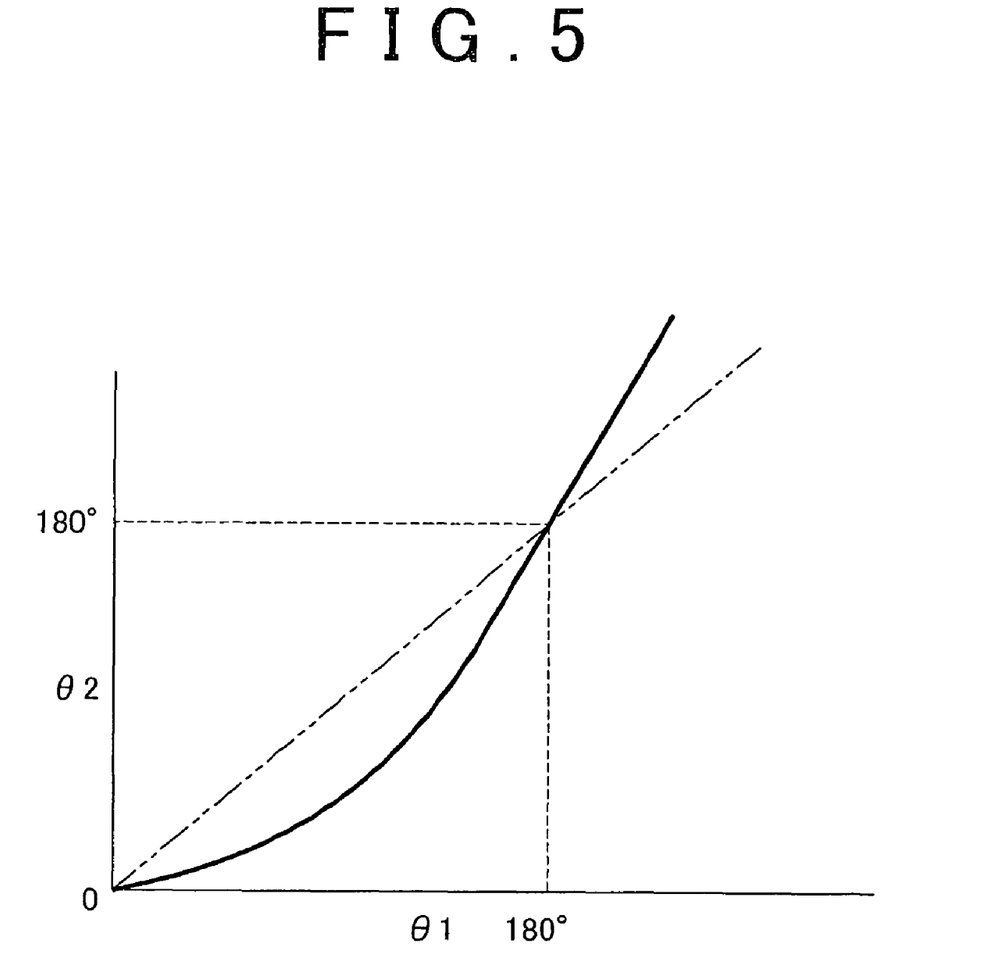
FIG. 5 is a graph showing the relationship between the rotation angle θ1 of the intermediate shaft and the rotation angle θ2 of the rotational shaft.

FIG. 5 shows a graph representing the relationship between a rotation angle θ1 of the intermediate shaft 36 shown in FIG. 4B and a rotation angle θ2 of the rotational shaft 32 in a case where the steering wheel 39 is rotated in one direction from the neutral position in the above-described steering apparatus 10 for a vehicle. As shown in the figure, as the rotation angle θ1 of the intermediate shaft 36 increases (the steering wheel 39 moves away from the neutral position), the rotation angle θ2 of the rotational shaft 32 increases nonlinearly and acceleratingly. Thus, the tilt angle θ2/θ1 of the graph is small close to the neutral position in which the rotation angle θ1 is small and increases gradually as the rotation angle θ1 approaches 180 degrees. As a result, close to the neutral position, the steered angle of the steered wheels 13, 13 related to the steering angle of the steering wheel 39 is comparatively small and the straightforward movement ability of the vehicle can be stabilized. In a position far from the neutral position, the steered angle of the steered wheels 13, 13 related to the steering angle of the steering wheel 39 is comparatively large and, for example, an emergency avoidance maneuver can be easily performed. The relationship between the rotation angle θ1 of the intermediate shaft 36 and the rotation angle θ2 of the rotational shaft 32 can be appropriately changed by changing the intershaft distances E1, E2.

Figure 3A:
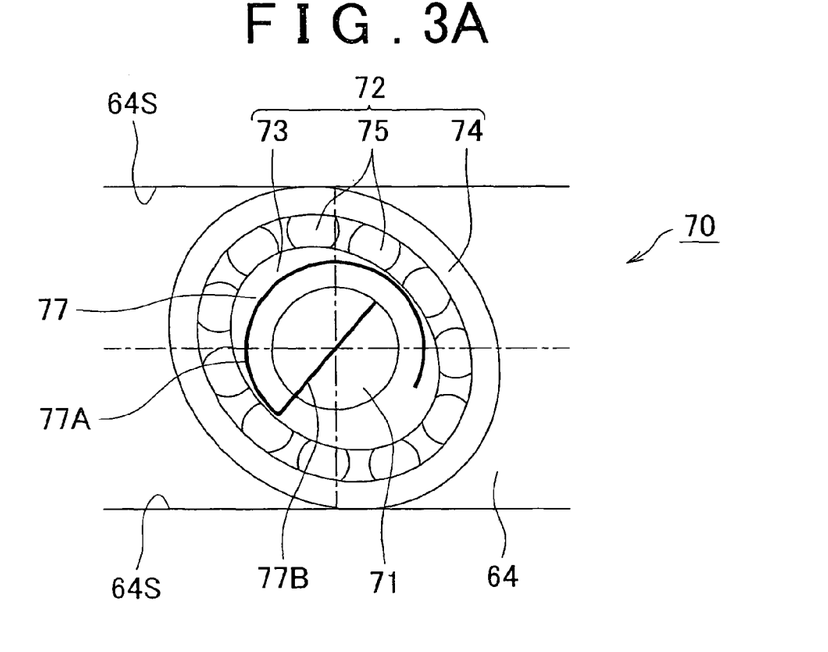
FIG. 3A is a plan view of a cam follower.
Figure 3B:
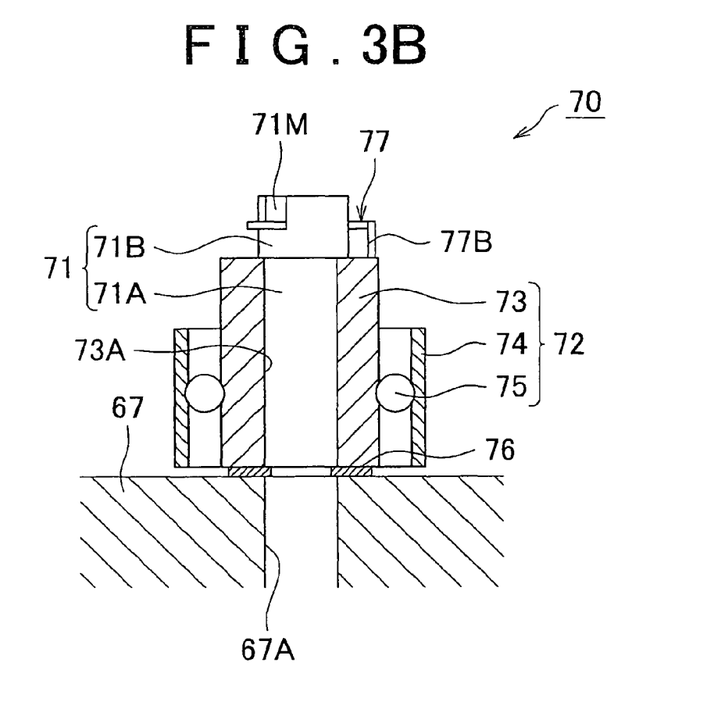
FIG. 3B is a side sectional view of a cam follower.

The cam follower 70 has the following configuration. Thus, as shown in FIGS. 2, 3A, and 3B, in the cam follower 70, an oval rotational body 72 is rotatably supported on a fixed pin 71 that rises up from the upper end portion of the second rotational base 65. Further, the oval rotational body 72 has a structure in which a flexible belt 74 is provided radially outside an oval core 73 that is rotatably supported by the fixed pin 71, so that there is a space between the flexible belt 74 and the oval core 73, and a plurality of rigid balls 75 are inserted and retained between the inner circumferential surface of the flexible belt 74 and the outer circumferential surface of the oval core 73.

As shown in FIG. 3B, in the fixed pin 71, a head portion 71B is provided at the upper end of a cylindrical column 71A, and the head portion 71B protrudes axially outward from the cylindrical column 71A. The lower end portion of the cylindrical column 71A is non-rotatably joined and fixed to an attachment hole 67A formed in a pin fixing stand 67.

As shown in FIG. 3A, the oval core 73 has an oval outer circumferential shape, a circular pin through hole is formed at the central portion of the oval core, and the cylindrical column 71A of the fixed pin 71 is inserted into the through hole. More specifically, the oval is an ellipse. Further, as shown in FIG. 3B, the oval core 73 is sandwiched between a step surface located between the head portion 71B and cylindrical column 71A and a spacer washer 76 installed at the intermediate section of the cylindrical column 71A, and the oval core is restricted its movement in the axial direction of the fixed pin 71.

The flexible belt 74 is constituted by a flat tubular rubber with a size in the radial direction less than that in the axial direction thereof. As shown in FIG. 3A, the flexible belt 74 is elastically deformed in an oval shape according to the outer circumferential surface of the oval core 73. The width of the circumferential surface of the flexible belt 74 is less than that of the circumferential surface of the oval core 73. Further, the plurality of rigid balls 75 retained between the flexible belt 74 and oval core 73 enable the flexible belt 74 to rotate smoothly about the oval core 73.

The outer diameter of the flexible belt 74 in the long axis direction of the oval core 73 is larger than the width of the cam groove 64. By contrast, the outer diameter of the flexible belt 74 in the short axis diameter of the oval core 73 is less than the width of the cam groove 64.

As shown in FIG. 3B, the oval core 73 protrudes upward from the upper end surface of the flexible belt 74. A bias spring 77 that rotationally biases the oval core 73 about the fixed pin 71 is provided between the oval core 73 and fixed pin 71. The bias spring 77 is a thin-wire spring that, as shown in FIG. 3A, has a shape such that a pair of straight portions 77B, 77B are bent up from both ends of a circular arc portion 77A that is obtained by elastically deforming the spring wire rod to a C-like shape along the outer circumferential surface of the fixed pin 71. One straight portion 77B is locked in a locking groove 71M at the upper end surface of the fixed pin 71, and the other straight portion 77B is locked in a locking hole (not shown in the figure) at the upper end surface of the oval core 73. When the steering wheel 39 is in a neutral position shown in FIG. 3A, the oval core 73 is biased in the clockwise direction about the fixed pin 71 by a restoration force (elastic repulsion force) of the circular arc portion 77A. The configuration of the steering apparatus 10 for a vehicle according to the embodiment is described above.

The operation of the embodiment will be described below. When the steering wheel 39 is in a neutral position, the bias spring 77 rotationally biases the oval core 73 in the clockwise direction in FIG. 3, that is, so that the long axis of the oval core 73 moves closer in parallel to a line that is parallel to the width direction of the cam groove 64. Therefore, intermediate portions of the outer circumferential surface of the cam follower 70 or flexible belt 74 that are between the short axis and long axis of the oval come into contact with both side surfaces 64S of the cam groove 64 in the width direction of the cam groove 64, as in the state shown in FIG. 4A. As a result, gaps between both side surfaces 64S of the cam groove 64 in the neutral position and the outer circumferential surface of the cam follower 70 are eliminated, and neutral stability of the steering wheel 39 and steering feeling during straightforward movement are improved.

Where the steering wheel 39 is operated, the steering torque thereof is transmitted to the rotational shaft 32 via the steering shaft 38, intermediate shaft 36, and eccentric joint mechanism 60 and converted into straightforward movement of the translation shaft 12 between the steered wheels 13 by the rack-and-pinion mechanism 35 provided at the lower end of the rotational shaft 32. As a result, the steered wheels 13, are steered.

Where the steering wheel 39 is operated, the first rotational base 61 provided at the lower end of the intermediate shaft 36 rotates in the same direction as the steering direction of the steering wheel 39. A side surface 64S at the rear side in the rotation direction, from among the two side surface 64S of the cam groove 64 formed in the first rotational base 61, pushes the cam follower 70 in the rotation direction. This pushing force generates a momentum in the direction of rotating the oval rotational body 72 of the cam follower 70 about the fixed pin 71 in the direction opposite to the biasing direction of the biasing spring 77. Where this momentum becomes larger than the biasing force of the biasing spring 77, the oval rotational body 72 rotates against the action of the biasing spring 77, and the long axis of the oval rotational body 72 moves close in parallel to both side surfaces 64S of the cam groove 64. As a result, a gap CL is formed between the other side surface 64S on the front side in the rotation direction of the intermediate shaft 36 and the outer circumferential surface of the flexible belt 74. Because of this gap CL, the cam follower 70 can be smoothly moved inside the cam groove 64. In this case, when the cam follower 70 moves inside the cam groove 64, the rigid balls 75 roll between the flexible belt 74 and oval core 73. As a result, the flexible belt 74 rolls over the side surface 64S of the cam groove 64, while rotating about the oval core 73.

Thus, with the steering apparatus 10 for a vehicle of the embodiment, when the steering wheel 39 is in a neutral position, the outer circumferential surface of the cam follower 70 and both side surfaces 64S in the width direction of the cam groove 64 come into contact and no gap is formed therebetween. Therefore, neutral stability of the steering wheel 39 and steering feeling during straightforward movement are improved. By contrast, where the steering wheel 39 is operated from the neutral position, a gap CL is formed between the outer circumferential surface of the cam follower 70 and one side surface 64S of the cam groove 64. As a result, the cam follower 70 can be smoothly moved inside the cam groove 64.

Further, when the flexible belt 74 is rotated with respect to the oval core 73, a plurality of rigid balls 75 retained therebetween roll. Therefore, the rotation of the flexible belt 74 with respect to the oval core 73 becomes smooth, and the cam follower 70 can move smoother inside the cam groove 64.

Figure 6A:
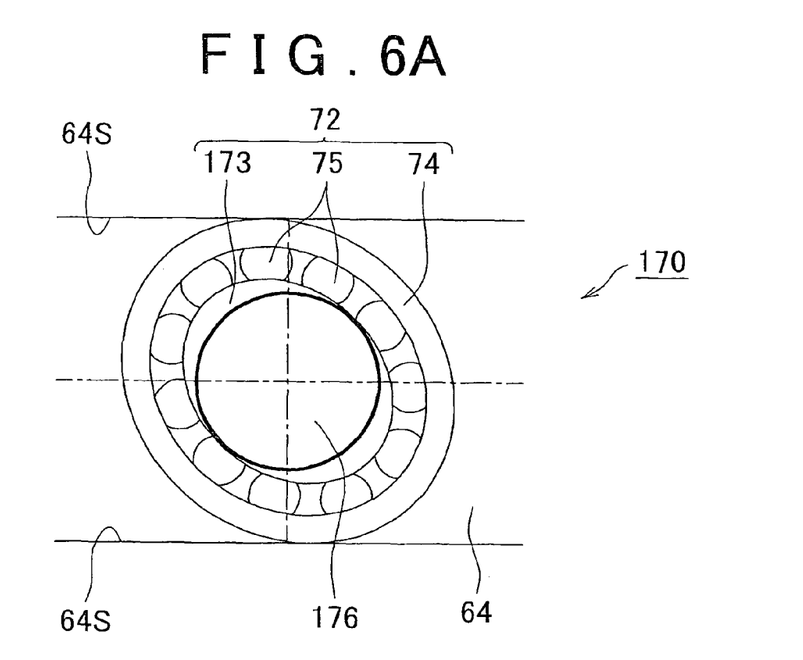
FIG. 6A is a plan view of the cam follower of the second embodiment.
Figure 6B:
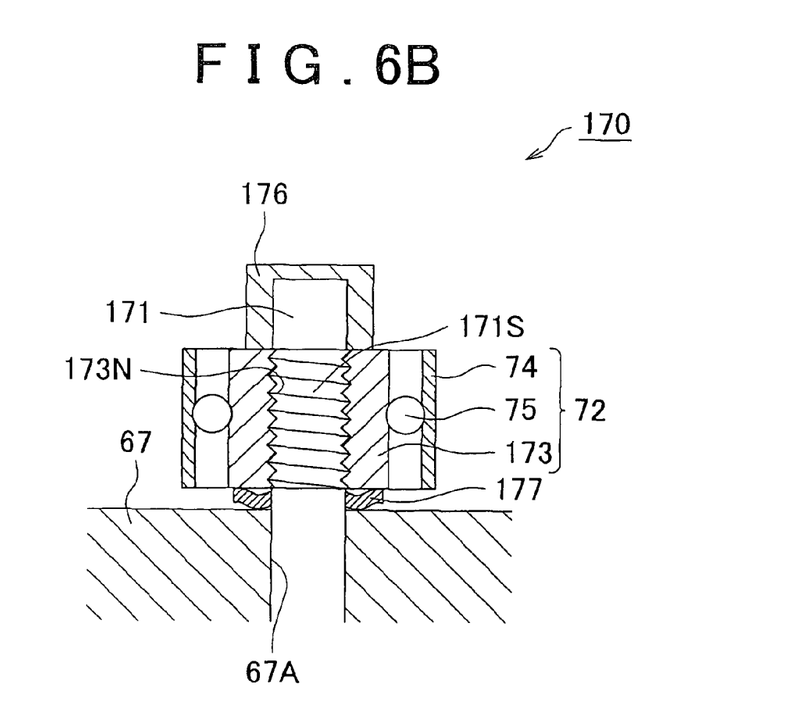
FIG. 6B is a side sectional view of the cam follower of the second embodiment.

FIG. 6 illustrates the second embodiment of the invention. In the second embodiment, the structure of a cam follower 170 is different from that in the first embodiment. Other components are identical to those of the first embodiment Identical components will be assigned with identical reference numerals and redundant explanation thereof will be omitted.

As shown in FIG. 6B, a lead screw 171S is formed at the outer circumferential surface of the fixed pin 171 in the cam follower 170 of the embodiment, and a female thread 173N that is screwed together with the lead screw 171S is formed at the inner circumferential surface of a pin through hole that is formed at the center of the oval core 173. Further, a locking cap 176 is joined and fixed to the upper end portion of the fixed pin 171 that passed through the oval core 173, so as to prevent the oval core 173 from slipping off the fixed pin 171. Furthermore, a wave washer 177 is sandwiched between the upper surface of the pin fixing stand 67 and the lower end surface of the oval core 173, and this wave washer 177 biases the oval core 173 upward in the axial direction of the fixed pin 171, that is, toward the locking cap 176. This biasing force is converted by the screwing of the screw 171S and female thread 173N into a biasing force acting in the direction of rotation about the fixed pin 171, that is, in the clockwise direction in FIG. 6A. Thus, with such a configuration, when the oval core 173 is rotationally biased about the fixed pin 171 and the steering wheel 39 is in the neutral position, the outer circumferential surface of the flexible belt 74 comes into contact with both side surfaces 64S, 64S of the cam groove 64 in the width direction of the cam groove 64. In this case, a plate spring, a compression coil spring, or a rubber elastic ring may be used instead of the wave washer 177. The embodiment demonstrates the effect similar to that of the first embodiment.

The invention is not limited to the above-described embodiments. For example, the above-described embodiments are included in the technical scope of the invention, but also various changes can be additionally made without departing from the essence of the invention.

Figure 7:
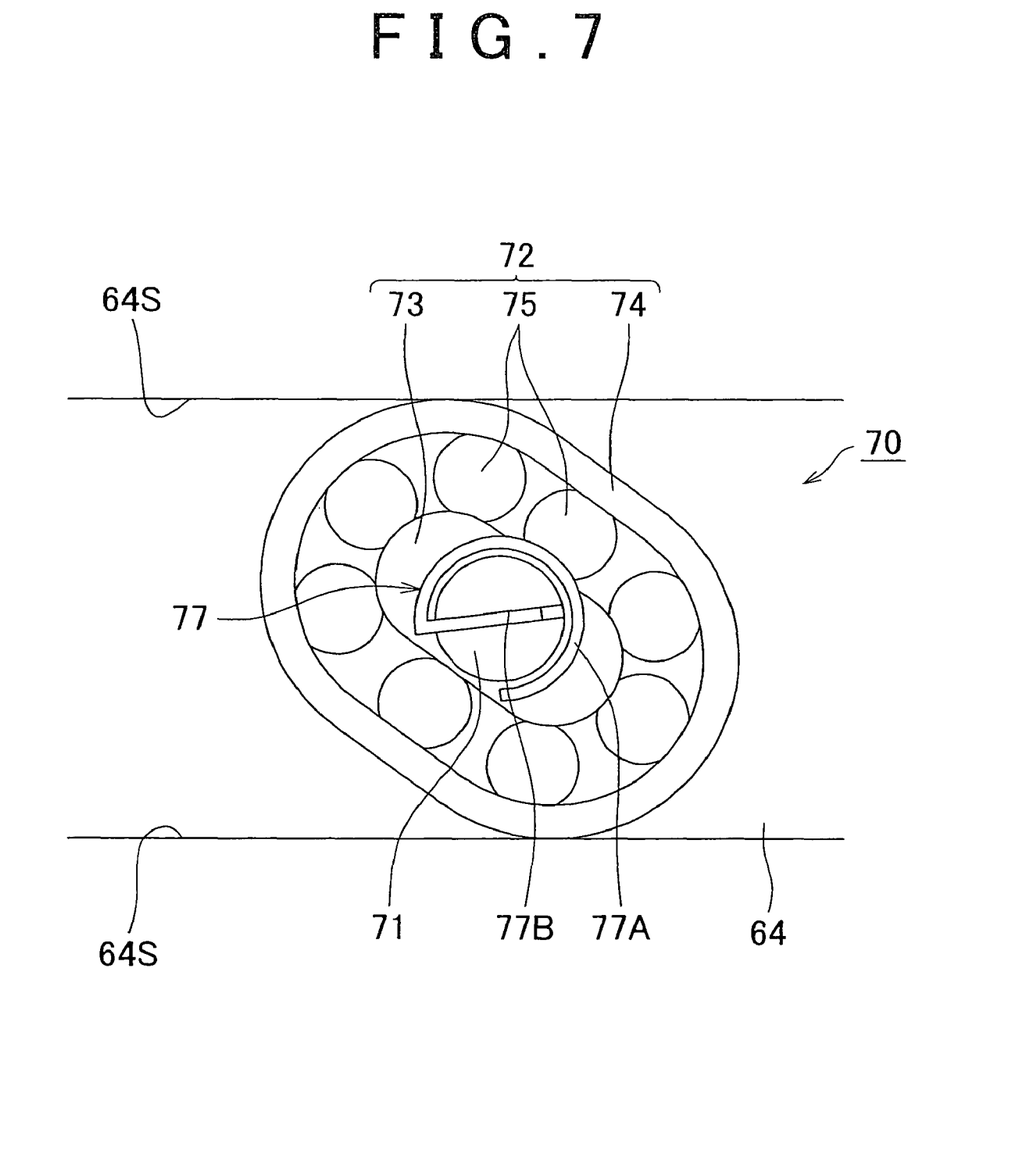
FIG. 7 is a plan view of a cam follower of a modification example that has a shape in which both ends of a pair of parallel straight portions are connected by semicircular portions.

The outer circumferential shape of the oval rotational body 72 may be a geometrically defined ellipse, a substantially elliptical shape that is analogous to the ellipse, and also a shape in which both ends of a pair of parallel linear portions are connected by semicircular portions, as shown in FIG. 7.

Figure 8A:
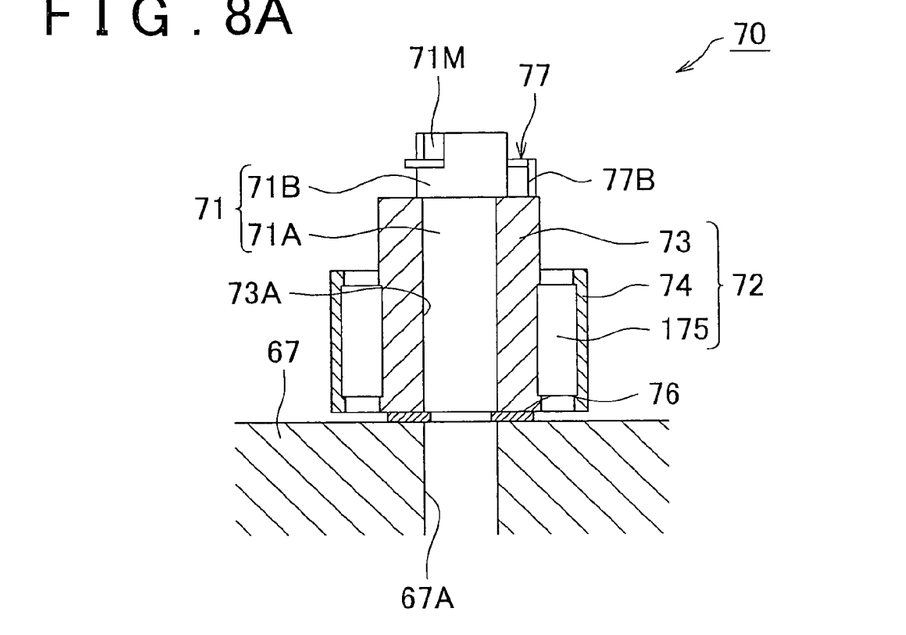
FIG. 8A is a side sectional view of a cam follower of a modification example in which the rigid balls of the first embodiment are replaced with rollers.
Figure 8B:
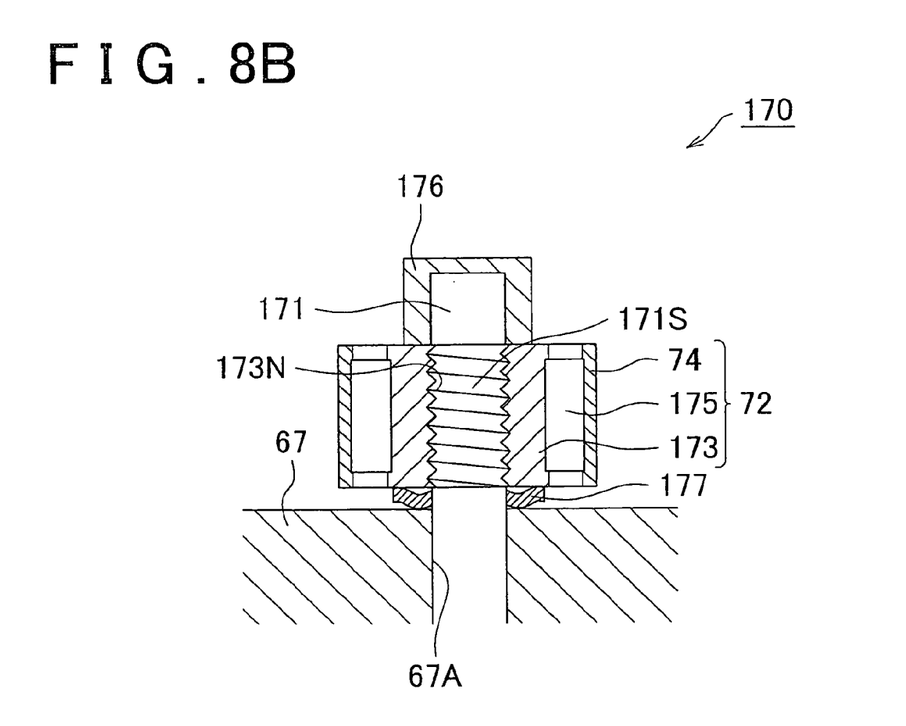
FIG. 8B is a side sectional view of a cam follower of a modification example in which the rigid balls of the second embodiment are replaced with rollers.

In the above-described embodiments, rolling elements that roll between the oval core 73, 173 and the flexible belt 74 are rigid balls 75, but cylindrical rollers 175 such as shown in FIGS. 8A and 8B may be also used.

In the above-described embodiments, rolling elements are provided between the oval core 73, 173 and the flexible belt 74, but it is also possible to use a configuration without rolling elements, in which the flexible belt 74 rotates, while sliding over the outer circumferential surface of the oval core 73, 173.

Further, a configuration without the flexible belt 74 may be used in which the oval core 73, 173 is in direct contact with and slides over the side surface 64S of the cam groove 64. In this case, a lubricant may be introduced between the oval core 73, 173 and cam groove 64, or the first rotational base 61 where the cam groove 64 is formed or the oval core 73 may be constituted by a self-lubricating material in order to suppress friction resistance between the oval core 73, 173 and both side surfaces 64S, 64S of the cam groove 64.

In the above-described embodiments, cam followers 70, 170 are provided at the rotational shaft 32 side and the cam groove 64 is provided at the intermediate shaft 36 side, but the arrangement of the cam follower 70, 170 and cam groove 64 may be reversed.

The invention is obviously applicable to an electric power steering apparatus of a rack assist system, and also may be applied to an electric power steering apparatus of a pinion assist system and an electric power steering apparatus of a column assist system in which a motor is gear linked to the intermediate portion of the steering shaft 38.

Further, in the above-described embodiments, the eccentric joint mechanism 60 is provided between the rotational shaft 32 and intermediate shaft 36, but this position is not limiting, and the eccentric joint mechanism may be also provided in any position between the steering wheel 39 and rotational shaft 32. For example, the same effect is demonstrated when the eccentric joint mechanism 60 is provided in the intermediate section of the intermediate shaft 36 or intermediate section of the steering shaft 38 serving as a steering column.

The invention claimed is:

1. A steering apparatus for a vehicle, having: a first rotational member that receives a steering torque from a steering wheel; a second rotational member that receives the steering torque from the first rotational member and transmits the steering torque to a steered wheel; a cam follower that is provided at an end surface of one of the first rotational member and the second rotational member and provided in a position displaced with respect to a rotational shaft of the one of the rotational members; and a cam groove that is formed in an end surface of the other of the first rotational member and the second rotational member and extends in a direction perpendicular to a rotational shaft of the other of the rotational members, wherein the rotational shaft of the first rotational member is displaced with respect to the rotational shaft of the second rotational member, and in a state in which the first rotational member is arranged above the second rotational member, the cam follower engages with the cam groove wherein the cam follower includes a fixed pin that is fixed to the one of the rotational members; an oval rotational body which is rotationally supported on the fixed pin, and in which an outer circumferential shape thereof is an oval, a long axis of the oval is longer than a width of the cam groove, and a short axis of the oval is shorter than the width of the cam groove; and biasing means for biasing the oval rotational body to rotate the oval rotational body in one direction of circumferential directions of the fixed pin.

2. The steering apparatus for a vehicle according to claim 1, wherein
the oval rotational body includes an oval core that is rotationally supported on the fixed pin and has an oval outer circumferential shape; and a flexible belt that is provided radially outside the oval core to be deformed into an oval shape, and can rotate about the oval core.

3. The steering apparatus for a vehicle according to claim 2, wherein
a plurality of rolling elements are retained between an outer circumferential surface of the oval core and an inner circumferential surface of the flexible belt.

4. The steering apparatus for a vehicle according to claim 1, wherein
the biasing means is a wire spring that is elastically deformed in a circular arc shape so that a wire rod extends along an outer circumferential surface of the fixed pin; and
one end of the wire spring is fixed to the fixed pin and the other end of the wire spring is fixed to the oval rotational body, whereby the wire spring rotationally biases the oval rotational body about the fixed pin.

5. The steering apparatus for a vehicle according to claim 1, wherein
the fixed pin and the oval rotational body are screwed together; and
a spring as the biasing means biases the oval rotational body in an axial direction of the fixed pin.

6. The steering apparatus for a vehicle according to claim 1, wherein
when the steering wheel is positioned in a neutral position, intermediate portions, between the long axis and the short axis, of an outer circumferential surface of the oval rotational body are in contact with both side surfaces of the cam groove in a width direction of the cam groove.

7. The steering apparatus for a vehicle according to claim 1, wherein
the biasing means biases the oval rotational body so that the long axis of the oval rotational body moves closer in parallel to a line that is parallel to a width direction of the cam groove.

8. The steering apparatus for a vehicle according to claim 1, wherein
when the steering wheel is operated, a gap is formed between the oval rotational body and one of side surfaces of the cam groove in a width direction of the cam groove.

9. The steering apparatus for a vehicle according to claim 1, wherein
when the steering wheel is operated, one of side surfaces of the cam groove in a width direction of the cam groove pushes the oval rotational body in a direction opposite to a biasing direction of the biasing means, whereby the oval rotational body is rotated in the direction opposite to the biasing direction of the biasing means.

10. The steering apparatus for a vehicle according to claim 1,
wherein when the steering wheel is operated, one of side surfaces of the cam groove in a width direction of the cam groove pushes the oval rotational body in a direction opposite to a biasing direction of the biasing, whereby the oval rotational body is rotated so that the long axis of the oval rotational body moves closer in parallel to both the side surfaces of the cam groove.

* * * * *